United States Patent
Baudru et al.

(10) Patent No.: US 9,137,870 B2
(45) Date of Patent: Sep. 15, 2015

(54) DEVICE AND METHOD FOR COMMUNICATION BETWEEN AN ELECTRONIC MODULE AND A DETECTION SENSOR IN THE PRESENCE OF A LIGHT SOURCE

(71) Applicants: CONTINENTAL AUTOMOTIVE FRANCE, Toulouse (FR); CONTINENTAL AUTOMOTIVE GmbH, Hannover (DE)

(72) Inventors: Stephan Baudru, Pins Justaret (FR); Cyril Robin, Villeneuve Tolosane (FR); Joel Carniaux, Toulouse (FR)

(73) Assignees: CONTINENTAL AUTOMOTIVE FRANCE, Toulouse (FR); CONTINENTAL AUTOMOTIVE GMBH, Hannover (DE)

( * ) Notice: Subject to any disclaimer, the term of this patent is extended or adjusted under 35 U.S.C. 154(b) by 237 days.

(21) Appl. No.: 13/940,690

(22) Filed: Jul. 12, 2013

(65) Prior Publication Data

US 2014/0015407 A1 Jan. 16, 2014

(30) Foreign Application Priority Data

Jul. 13, 2012 (FR) ...................................... 12 56765

(51) Int. Cl.
*B60Q 1/14* (2006.01)
*H05B 33/08* (2006.01)
*H04B 3/54* (2006.01)
*H05B 37/02* (2006.01)

(52) U.S. Cl.
CPC ............ *H05B 33/0848* (2013.01); *H04B 3/548* (2013.01); *H05B 33/0815* (2013.01); *H05B 37/0263* (2013.01); *H04B 2203/5412* (2013.01); *H04B 2203/5454* (2013.01)

(58) Field of Classification Search
CPC ... H05B 33/0848; H05B 33/0842; B60Q 1/14
USPC ................. 315/77, 84, 180, 280, 307, 291; 327/517; 362/501
See application file for complete search history.

(56) References Cited

U.S. PATENT DOCUMENTS

2009/0245344 A1* 10/2009 Ploix .............................. 375/238
2009/0295294 A1* 12/2009 Skene ............................. 315/77

(Continued)

FOREIGN PATENT DOCUMENTS

| EP | 1 760 227 A1 | 3/2007 |
| WO | 01/54298 A1 | 7/2001 |
| WO | 2009/081424 A1 | 7/2009 |

OTHER PUBLICATIONS

French Search Report, dated Apr. 8, 2013, from corresponding French application.

*Primary Examiner* — Lincoln Donovan
*Assistant Examiner* — Thomas Skibinski
(74) *Attorney, Agent, or Firm* — Young & Thompson

(57) ABSTRACT

Method for communication between an electronic module and a sensor having a light source and being supplied by supply line, the electronic module measuring the modulations of the intensity of the current in the line. The sensor drives a gradual turning on/turning off of the light source by a first modulation of the intensity of the current such that: the light source is turned off, respectively turned on, when the intensity of the current is in a low, respectively high, state, and the light source illuminates, respectively turns off, when the duty ratio of the intensity of the current varies from the high state to the low state and vice versa. During detection, the sensor dispatches a second modulation through the light source, however if the light source is turning on (or off), this is interrupted and the intensity of current is forced to the high (or low) state.

12 Claims, 3 Drawing Sheets

(56) References Cited

U.S. PATENT DOCUMENTS

| | | | |
|---|---|---|---|
| 2011/0121730 A1* | 5/2011 | Ito et al. | 315/77 |
| 2011/0181197 A1* | 7/2011 | Kanda et al. | 315/268 |
| 2012/0235568 A1* | 9/2012 | Prodin et al. | 315/77 |
| 2014/0015408 A1* | 1/2014 | Cordier et al. | 315/77 |
| 2014/0145611 A1* | 5/2014 | Baudru et al. | 315/77 |

* cited by examiner

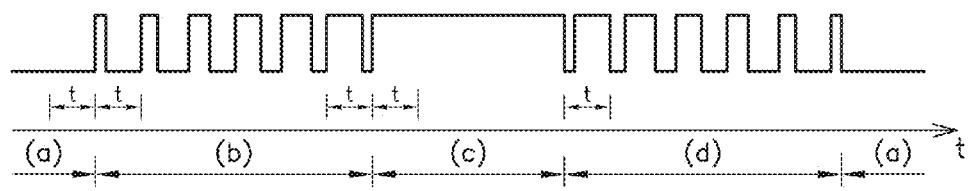
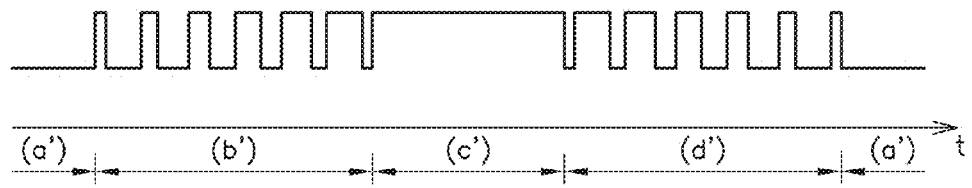
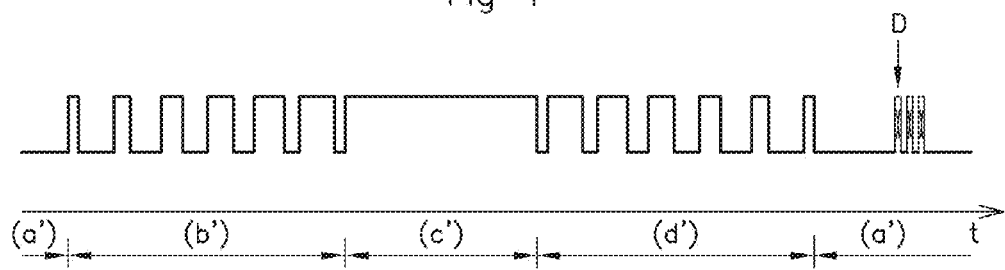
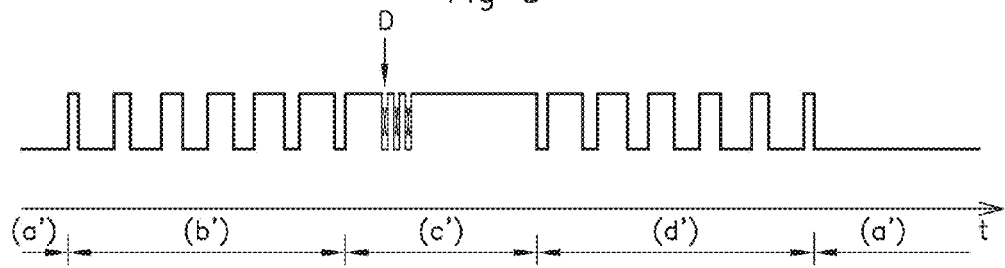

DEVICE AND METHOD FOR COMMUNICATION BETWEEN AN ELECTRONIC MODULE AND A DETECTION SENSOR IN THE PRESENCE OF A LIGHT SOURCE

FIELD OF THE INVENTION

The invention relates to a device and a method for communication between an electronic module and a detection sensor. More particularly, the invention proposes a device for communication between an electronic module onboard an automotive vehicle and a sensor sited remotely from the electronic module and situated on said vehicle.

BACKGROUND OF THE INVENTION

Nowadays, automotive vehicles comprise several electronic modules for controlling the diverse sensors and/or actuators situated on the vehicle. Certain modules manage the sensors and/or the actuators of the power train. They are called ECU ("Engine Control Unit"). Others manage the sensors and/or actuators situated in the bodywork of the vehicle, they are called BCM ("Body Control Module"), that is to say control module relating to the sensors and/or actuators situated in the bodywork of the vehicle. The BCM thus manages in particular the approach and/or contact detection sensors situated in the doors' handles of the vehicle.

These approach and/or contact detection sensors are capacitive sensors, known to the person skilled in the art, that detect the approach and/or the contact of a user's hand on a locking or unlocking zone of the handle. The capacitive sensor detects this approach and/or contact, and then it dispatches a detection information item to the BCM. The BCM receives this information item, as well as other information items originating from other sensors and/or actuators of the vehicle, for example the information item relating to the state of the door (locked/unlocked), or the information item relating to the identifier of the device for hands free access to the vehicle, that is to say of the key or of the badge carried by the user. The microcontroller of the BCM then analyses all these data in order to verify that the user is properly authorized to access the vehicle and that a locking or unlocking can be carried out. If the user is authorized, the BCM then triggers the locking or the unlocking of the vehicle, that is to say it operates the actuators for locking or unlocking the door.

The dimensions of the vehicle door handle being quite small, the latter generally contains only the detection sensor, that is to say at least one detection electrode, a microcontroller and associated electronics (electrical supply for example), and sometimes an emission antenna. Detection is carried out by the microcontroller integrated into the sensor, but the control of the locking or unlocking of the door is centralized in the BCM, on receipt of the approach and/or contact detection information item dispatched by the microcontroller integrated into the sensor and as may or may not be the case, as explained previously, on receipt of other information items originating from the vehicle.

There is therefore a unidirectional communication between the detection sensor and the BCM, since the sole function of the sensor is to inform the BCM when an approach has been detected. In FIG. 1 is represented the electronic diagram of the communication between a detection sensor 20 and a BCM 10. The BCM 10, comprises a microcontroller 11, connected to a voltage of the battery VBAT by a current-supply line W1, and connected to the ground GND. The BCM 10 also comprises a resistor R1, situated on the supply line W1. The microcontroller 11 of the BCM 10 and associated electronics (not represented) make it possible to measure a voltage across the terminals of the resistor R1.

The detection sensor 20 comprises an electrical supply 21 connected directly to the voltage of the battery VBAT, by the supply line W1, and connected to the ground GND by the BCM 10. The detection sensor 20 furthermore comprises, a microcontroller 22, connected to an approach and/or contact detection electrode 23. The microcontroller 22 of the detection sensor 20 monitors the variation of the capacitance between the electrode 23 and the ground GND. When this capacitance exceeds a threshold, thereby signifying the approach and/or the contact of a hand of the user on the handle, the microcontroller 22 then dispatches an approach and/or contact detection signal to the BCM 10. Accordingly, the microcontroller 22 closes a first switch S1. This closure creates an inrush of current through a resistor R10 placed between the switch S1 and the supply line W1, downstream of the resistor R1. This current inrush propagates toward the BCM 10 and is then detected by the microcontroller 11 of the BCM 10 and the associated electronics, at the terminals of the resistor R1. By closing according to a determined sequence the switch S1, the microcontroller 22 of the detection sensor 20 thus dispatches an approach and/or contact detection signal to the microcontroller 11 of the BCM 10 by way of the supply line W1. The microcontroller 11 of the BCM 10, after analysis of this detection signal, undertakes the locking or unlocking.

This device is known to the person skilled in the art.

However, the latest trend is to add functionalities in the door handle of a vehicle, in particular to add a light source which will turn on according to one or more precise event(s) detected by the BCM 10. This light source, generally a light-emitting diode, commonly dubbed LED, is integrated into the detection sensor 20 and connected to the microcontroller 22.

This is carried out with the aim of user comfort or with the aim of esthetics. This light source is turned on for example when a certain darkness around the vehicle has been detected, and when a user authorized to access the vehicle has been detected in proximity to the vehicle. The turning on of the light source can also be triggered after the user gets out of his vehicle and the doors are closed so as to light up the locking zone or the unlocking zone situated inside the handle on which he must press to lock his door. Or else, this light source is turned on when the user has touched the handle, in order to light up the unlocking zone on which the user must press to unlock the openable panels of his vehicle and get into his vehicle. These events (presence of an authorized user around the vehicle, getting out of the user, closing of the door, detection of contact on the handle, etc.), originating from the various sensors/actuators of the vehicle, are detected by the BCM 10.

Now, on the supply line W1, the current inrushes generated to turn on the light source are of the same order of magnitude as the current inrushes generated during the communication between the detection sensor 20 and the BCM 10. When the light source is turned on, communication from the sensor to the BCM 10 is therefore impossible.

The existing solutions propose to control the turning on of the light source by the addition of an extra wire link-up between the BCM 10 and the detection sensor 20.

Now, the addition of a wire link-up between the BCM 10 and the detection sensor 20 situated in the door handle goes with problems regarding integration, because of the restricted space in the handle, problems regarding connection arrangements and cost for the BCM 10, since the latter must be specifically modified for the types of handles comprising an LED, and consequently a generic BCM common to all the types of handles is no longer conceivable.

SUMMARY OF THE INVENTION

The objective of the present invention is to propose a solution which makes it possible to manage the turning on and the turning off of the light source while allowing the transmission of the information items relating to the detection of a predefined event from the detection sensor to the BCM and therefore to manage, on one and the same supply line W1, the current inrushes generated to turn on the light source and the current inrushes generated during the communication between the detection sensor and the BCM.

For this purpose, and according to a first aspect, the invention relates to a method for communication between an electronic module and a detection sensor, said detection sensor comprising a light source and being supplied with current by way of a supply line connected to a voltage source, said electronic module being suitable for measuring the modulations of the intensity of the current flowing on said supply line. The detection sensor drives a gradual turning on/turning off of the light source by way of a first modulation of the current flowing in said light source in such a way that:

the light source is turned off when the intensity of the current is in a so-called low state,
the light source is turned on when the intensity of the current is in a so-called high state,
the light source illuminates in a gradual manner when the intensity of the current evolves with a duty ratio varying gradually from the low state to the high state,
the light source turns off in a gradual manner when the intensity of the current evolves with a duty ratio varying gradually from the high state to the low state.

When a predefined event is detected by the detection sensor, said detection sensor notifies the electronic module with an information item according to which the event has been detected, in the form of a second predefined modulation of the intensity of current flowing in the light source with respect to a high or low state depending on whether the light source is turned on or turned off, with the proviso that prior to this notification, if the light source is in the process of turning on, respectively of turning off, the gradual turning on, respectively the gradual turning off, of said light source is interrupted so as to bring the intensity of current flowing in said light source to the high state, respectively to the low state.

Thus, the communication of the information item according to which an event has been detected by the detection sensor is carried out by priority over the turning on/turning off of the LED, without creating interference.

In a mode of implementation of the method, the high state corresponds to 100% of the duty ratio and the low state corresponds to 0% of the duty ratio.

Judiciously, in a preferential embodiment of the method of the invention, when the detection sensor notifies the electronic module with an information item according to which the event has been detected, the second predefined modulation of the intensity of current flowing in the light source with respect to a high state corresponds to a duration of temporary interruption of the control signal for turning on the light source of less than 10%. Thus the decline in brightness of the light source caused by the second modulation of current intensity (in order to notify the electronic module that an event has been detected) is not perceptible to the user. According to a second aspect, the invention relates to a communication device comprising an electronic module and a detection sensor, said detection sensor comprising a light source and being supplied with current by way of a supply line connected to a voltage source, said electronic module being suitable for measuring the modulations of the intensity of the current flowing on said supply line, characterized in that the detection sensor is configured to drive a gradual turning on/turning off of the light source by way of a first gradual modulation of the intensity of the current flowing in said light source between a high state in which the light source is turned on and a low state in which the light source is turned off, and to notify the electronic module, when it has detected a predefined event, with an information item according to which the event has been detected, in the form of a second predefined modulation of the intensity of current flowing in the light source with respect to a high or low state of the intensity of the current depending on whether the light source is turned on or turned off.

In a particular embodiment of the communication device, the detection sensor is configured to notify the BCM with the information item according to which an event has been detected, that if the intensity of the current flowing in the light source is in a high state or a low state.

In a particular embodiment of the communication device, when the detection of an event takes place when the light source is in the process of turning on/turning off, the detection sensor is configured to interrupt the gradual turning on/turning off of the light source and bring the intensity of current flowing in the light source to the high/low state.

Likewise, in a preferential embodiment of the device of the invention, when the detection sensor notifies the electronic module with an information item according to which the event has been detected, the second predefined modulation of the intensity of current flowing in the light source with respect to a high state corresponds to a duration of temporary interruption of the control signal for turning on the light source of less than 10%. Thus the decline in brightness of the light source caused by the modulation of current intensity (in order to notify the electronic module that an event has been detected) is not perceptible to the user.

The invention also relates to a vehicle comprising a communication device described previously in at least one of its embodiments.

BRIEF DESCRIPTION OF THE DRAWINGS

The invention will now be more precisely described within the framework of preferred embodiments, which are in no way limiting thereof, represented in FIGS. 1 to 7, in which:

FIG. 3a illustrates a control signal for turning on the LED, as a function of time, at the point P1, when no approach D has been detected, FIG. 3b illustrates the output signal seen by the microcontroller of the BCM, as a function of time, when no approach D has been detected, FIGS. 4, 5, 6, and 7 illustrate the output signal seen by the microcontroller of the BCM, as a function of time, when an approach D has been detected, according to the various phases of turning on/turning off of the LED.

DETAILED DESCRIPTION OF THE INVENTION

Figure 1:
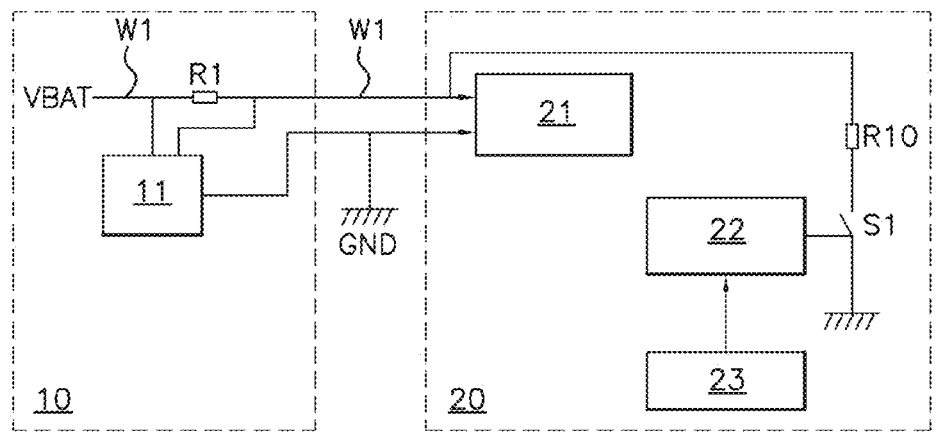
FIG. 1 represents an electrical diagram of a device for communication between a detection sensor and a BCM, according to the prior art.
Figure 2:
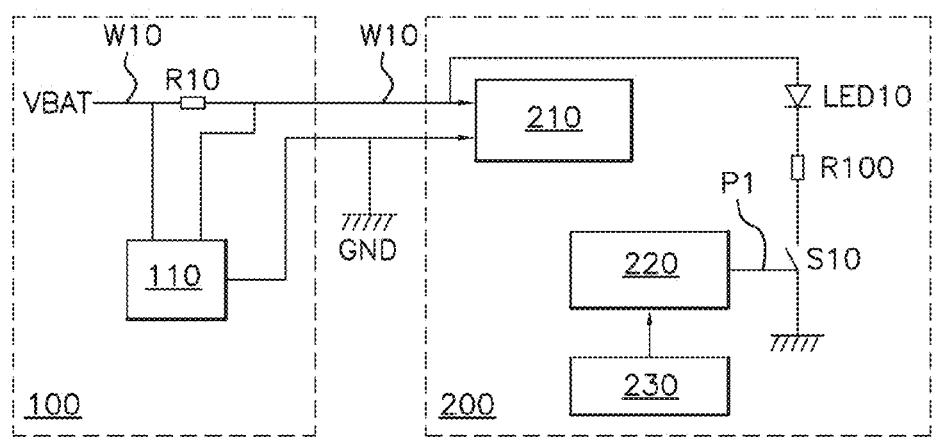
FIG. 2 represents an electrical diagram of a device for communication between a detection sensor equipped with an LED and a BCM, according to the invention.
Figure 6:
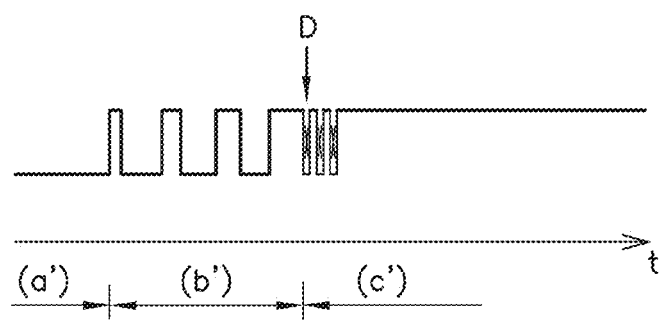
Figure 7:
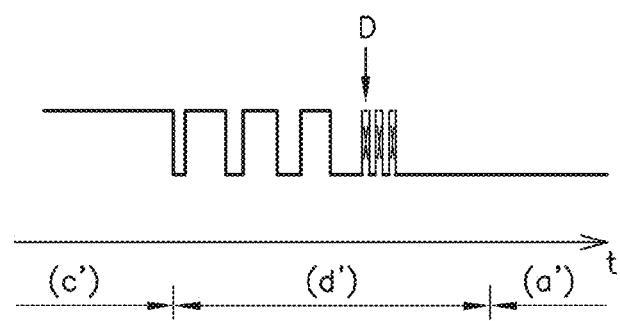

A communication device according to the invention, illustrated in FIG. 2, comprises:

an electronic module 100, in our example a BCM,
a capacitive detection sensor 200,
a current-supply line W10 connecting the BCM 100 to the sensor 200.

The BCM 100 comprises a microcontroller 110 connected to a voltage of the battery VBAT by the current-supply line W10 and connected to a ground GND. The BCM 100 furthermore comprises a resistor R10, situated on the supply line W10, to the terminals of which the microcontroller 110 and associated electronics are connected.

The detection sensor 200 comprises:
an electrical supply 210 connected directly to the voltage of the battery VBAT, via the supply line W10, and connected to the ground GND by the BCM 100,
a microcontroller 220, connected to at least one capacitive electrode 230 for detecting approach and/or contact,
a light source, in our example an LED LED10.

The detection sensor 200 furthermore comprises a switch S10 (for example in the form of a transistor), at the output of the microcontroller 220, as well as a resistor R100 connected to the supply line W10 and to the switch S10. The LED LED10 is in series with the resistor R100.

The microcontroller 110 of the BCM 100 and its associated electronics are suitable for measuring the modulations of the intensity of the current flowing on the supply line W10.

The communication device is particularly suitable for detecting the approach and/or contact of a user in a locking/unlocking zone of a vehicle door, especially of an automotive vehicle. In the example described in a non-restrictive manner, the detection sensor is integrated into a door handle of the vehicle and is able to detect this approach and/or contact and then to dispatch a signal to the BCM which, after analysis, undertakes the unlocking of said automotive vehicle. The LED LED10, integrated into the detection sensor 20, allows the lighting of a locking or unlocking zone situated in the handle so as to direct the user toward said handle.

Events, such as for example the presence of an authorized user around the vehicle, originating from other sensors/actuators of the vehicle, are detected by the BCM 100. The latter centralizes these information items and, as a function of the latter, dispatches a request signal for turning on the LED LED10 to the detection sensor 200.

The invention is described with an LED LED10 as a non-limiting example of an actuator. Other actuators other than an LED, can also be activated by the device and method of the invention.

The detection sensor 200 generates a signal to control the gradual turning on/turning of the switch S10 in the form of a first modulation of the intensity of current flowing in the LED LED10 via the supply line W10.

This first modulation of the intensity of current, dispatched by the microcontroller 220 of the detection sensor 200 to the transistor S10, is generated in the form of a Pulse Width Modulation digital signal, commonly called a PWM signal, with duty ratio lying between 0 and 100%. The switch S10 is then opened and closed in a periodic manner to undertake the inrush of current originating from the BCM 100 so as to gradually turn on/turn off the LED LED10.

In the exemplary embodiment, the first modulation of the intensity of the current flowing in the LED LED10 is such that the LED LED10 turns on gradually from 0% to 100% of illumination. The first modulation of the intensity of the current flowing in the LED LED10 consists of a pulse width modulation of the intensity of the current of gradual duty ratio lying between 0 and 100%, where 0% corresponds to a low state of the intensity of current, that is to say a state where the LED LED10 is turned off and 100% corresponds to a high state of the intensity of current, that is to say a state where the LED LED10 is turned on.

FIG. 3a represents the control signal for turning on/turning off the LED LED10 as a function of time, at the point P1 (at the output of the microcontroller 220 of the detection sensor 200), when no approach and/or contact has been detected by the detection sensor 200 and therefore when no communication from the detection sensor 200 to the BCM 100 is required.

By definition, the duty ratio of a signal is defined as the ratio of the time spent by the signal in a so-called final state to a period t of the signal.

The control signal (PWM signal) decomposes into four phases, as illustrated in FIG. 3a:
a) a phase where the duty ratio of the control signal is at 0% (represented by the portion (a) in FIG. 3a); the intensity of the current flowing in the LED LED10 which stems therefrom is in the low state (represented by the portion (a') in FIG. 3b), that is to say the LED LED10 is turned off,
b) a phase where the duty ratio of the control signal is at 100% (represented by the portion (c) in FIG. 3a); the intensity of the current flowing in the LED LED10 which stems therefrom is in the high state (represented by the portion (c') in FIG. 3b), that is to say the LED LED10 is turned on,
c) a phase where the duty ratio of the control signal varies gradually from 0% to 100% (represented by the portion (b) in FIG. 3a); the intensity of the current flowing in the LED LED10 which stems therefrom is such that the pulse width of the intensity of the current increases from 0 to 100% (represented by the portion (b') in FIG. 3b),
d) a phase where the duty ratio of the control signal varies gradually from 100% to 0% (represented by the portion (d) in FIG. 3a); the intensity of the current flowing in the LED LED10 which stems therefrom is such that the pulse width of the intensity of the current decreases from 100 to 0% (represented by the portion (d') in FIG. 3b).

In an exemplary embodiment, the duration of the gradual turn-on (or turn-off) phase is 700 ms.

FIG. 3b represents the output signal seen by the microcontroller 110 of the BCM 100, (i.e. the potential difference across the terminals of the resistor R10), that is to say the modulations of the intensity of the current flowing on the supply line W10, as a function of the various phases of the control signal, when no approach and/or contact has been detected by the detection sensor 200 and therefore when no communication from the detection sensor 200 to the BCM 100 is required.

When an approach and/or contact has been detected by the detection sensor 200, a communication signal must be dispatched, on the supply line W10, by the microcontroller 220 of the detection sensor 200 to the microcontroller 110 of the BCM 100.

The dispatching of the information item relating to the detection of approach of the detection sensor 200 to the BCM 100 by way of the supply line W10 remains identical to the prior art. To summarize, the detection by the at least one electrode 230 of the approach of the user produces a communication signal which is dispatched by the microcontroller 220 of the sensor 200 in the form of current inrushes, opening/closing the switch S10, to the microcontroller 110 of the BCM 100, that said microcontroller 110 of the BCM 100 detects and decodes. This communication signal lasts only a few milliseconds, and it is dispatched only when the microcontroller 220 of the detection sensor 200 detects the presence of a hand near the at least one electrode 230.

The communication of the communication signal from the detection sensor 200 to the BCM 100 must be done straightaway, by priority over the control signal for turning on/turning off the LED LED10, but without interference with said control signal.

The principle of the invention relies on the fact that the communication of the information item relating to the detection of approach of the detection sensor 200 to the BCM 100 is performed only when the intensity of the current flowing in the LED LED10 is in the low state or in the high state, that is to say when the LED LED10 is turned off or turned on.

Specifically, the principle consists in temporarily interrupting the emission of the control signal for turning on/turning off the LED LED10, when the LED LED10 is turned off or turned on. During this temporary interruption, the supply line W10 can be used to allow the dispatching of the communication signal from the detection sensor 200 to the BCM 100. The durations of temporary interruption of the control signal of the LED LED10 are substantially equal, preferably they are equal, to the durations of the widths of the pulses used for the communication signal from the detection sensor 200 to the BCM 100.

When the LED LED10 is in the process of gradually turning on, respectively of turning off, the principle consists in previously forcing the control signal to the high state, respectively to the low state, and then in dispatching the communication signal from the detection sensor 200 to the BCM 100.

FIGS. 4 to 7 illustrate the principle and illustrate the output signal seen by the microcontroller 110 of the BCM 100, (i.e. the potential difference across the terminals of the resistor R10), as a function of time, when an approach D has been detected, according to the various phases of turning on/turning off of the LED LED10.

a) (FIG. 4) When the LED LED10 is turned off and an approach and/or contact D of a user is detected by the detection sensor 200, the communication signal is dispatched from the microcontroller 220 of the detection sensor 200 to the microcontroller 110 of the BCM 100. The dispatching of the communication signal in the form of a current inrush causes a second modulation of the intensity of the current flowing in the LED LED10, causing it to turn on temporarily. This temporary lighting up of the LED LED10 can thus be used as a means of visual confirmation of the communication of the communication signal to the BCM 100.

b) (FIG. 5) When the LED LED10 is turned on and an approach D is detected by the detection sensor 200, the control of the LED LED10 is immediately and temporarily interrupted for the time for the microcontroller 220 of the detection sensor 200 to dispatch the communication signal to the microcontroller 110 of the BCM 100, that is to say to dispatch the second intensity modulation.

The durations of temporary interruption of the control of the LED LED10, equivalent to the durations of dispatching of the communication signals, are sufficiently short as not to disturb the brightness of the LED LED10, for example the dispatching of the communication signals is split into seven signals of 100 μs over a control signal period for the LED LED10 of 15 ms, this being equivalent to a brightness variation of the order of 5%.

Thus judiciously, the invention makes it possible to dispatch the communication signals while the light source is turned on without the impact on the brightness being perceptible to the user. It is considered that a maximum brightness variation of 10% can be tolerated for dispatching the communication signals without impacting the user's perception of the brightness.

A maximum of 10% of the brightness variation caused by the temporary stopping of the control of the LED LED10 is therefore accepted so as to allow the transmission of the communication signal from the detection sensor 200 to the BCM 100. Such a brightness variation is imperceptible to the user.

c) (FIG. 6) When the LED LED10 is in the turning-on phase, and an approach and/or contact D of a user is detected by the detection sensor 200, it is not possible to dispatch the communication signal from the detection sensor 200 to the BCM 100 immediately. The control signal of the LED LED10 is initially forced to the high state, in such a way that the duty ratio of the control signal of the LED LED10 passes to 100% and that the intensity of the current flowing in the LED LED10 is in the high state. Next, the control of the turning on/turning off of the LED LED10 is immediately and temporarily interrupted, for the time for the microcontroller 220 of the detection sensor 200 to dispatch the communication signal to the microcontroller 110 of the BCM 100.

d) (FIG. 7) When the LED LED10 is in the turning-off phase, and an approach and/or contact D of a user is detected by the detection sensor 200, it is again not possible to dispatch the communication signal from the detection sensor 200 to the BCM 100 immediately. The control signal of the LED LED10 is initially forced to the low state, in such a way that the duty ratio of the control signal passes to 0% and that the intensity of the current flowing in the LED LED10 is in the low state. Next, the communication signal is dispatched from the microcontroller 220 of the detection sensor 200 to the microcontroller 110 of the BCM 100.

The communication signal dispatched to the microcontroller 110 of the BCM 100 is an encoded digital signal of type known per se. It is defined in such a way that it begins with a particular sequence, termed "start communication", which allows the BCM 100 to differentiate the start pulse (or bit) of a communication intended for it from a start pulse (or bit) for commencing illumination or for commencing the turning off of the LED LED10 and to indicate to the BCM 100 that the following information items are communication data.

The signal is also defined in such a way that it ends with a particular sequence, termed "stop communication" which makes it possible to indicate to the BCM that the communication signal has finished.

Thus, the BCM 100 is able to differentiate the start and end of a communication signal from the start and end of a control signal.

In one embodiment of the invention, when the LED LED10 is turned off, the 1st pulse of the communication signal is a rising-edge pulse, as illustrated in FIG. 4, and when the LED LED10 is turned on, the 1st pulse of the communication signal is a falling-edge pulse, as illustrated in FIG. 5.

The description hereinabove clearly illustrates that through its various characteristics and their advantages, the present invention achieves the objectives that it sought. In particular, it proposes a device, economical in terms of components (a transistor and a resistor) and a method allowing a communication between the BCM 100 and the detection sensor 200 by way of a single supply line W10, by managing the communication from the detection sensor 200 to the BCM 100 outside of the phases of turning on and turning off of the LED LED10, while ensuring the functionality of capacitive detection and of communication of this detection straightaway when a predefined event is detected by the detection sensor.

The invention also advantageously makes it possible, during the transmission of the communication signal of the detection sensor 200 to the BCM 100, to benefit from a brightness, even low, of the LED LED10 in the locking/unlocking zone. This brightness can thus be used as a means of visual confirmation of the detection of approach and/or contact of the user.

The invention claimed is:

1. A method for communication between an electronic module (100) and a detection sensor (200), said detection sensor comprising a light source (LED10) and being supplied with current by way of a supply line (W10) connected to a voltage source (VBAT), said electronic module being suitable for measuring the modulations of the intensity of the current flowing on said supply line, characterized in that the detection sensor (200) drives a gradual turning on/turning off of the light source (LED10) by way of a first modulation of the intensity of the current flowing in said light source in such a way that:
the light source (LED10) is turned off when the intensity of the current is in a so-called low state,
the light source (LED10) is turned on when the intensity of the current is in a so-called high state,
the light source (LED10) illuminates in a gradual manner when the intensity of the current evolves with a duty ratio varying gradually from the low state to the high state,
the light source (LED10) turns off in a gradual manner when the intensity of the current evolves with a duty ratio varying gradually from the high state to the low state,
and in that when a predefined event (D) is detected by the detection sensor (200), said detection sensor notifies the electronic module (100) with an information item according to which the event (D) has been detected, in the form of a second predefined modulation of the intensity of current flowing in the light source (LED10) with respect to a high or low state depending on whether the light source (LED10) is turned on or turned off, with the proviso that prior to this notification, if the light source (LED10) is in the process of turning on, respectively of turning off, the gradual turning on, respectively the gradual turning off, of said light source is interrupted so as to bring the intensity of current flowing in said light source to the high state, respectively to the low state.

2. The method for communication as claimed in claim 1, in which the high state corresponds to 100% of the duty ratio and the low state corresponds to 0% of the duty ratio.

3. The method as claimed in claim 2, characterized in that, when the detection sensor notifies the electronic module (100) with an information item according to which the event (D) has been detected, the second predefined modulation of the intensity of current flowing in the light source (LED10) with respect to a high state corresponds to a duration of temporary interruption of the control signal for turning on the light source (LED10) of less than 10%.

4. The method as claimed in claim 1, characterized in that, when the detection sensor notifies the electronic module (100) with an information item according to which the event (D) has been detected, the second predefined modulation of the intensity of current flowing in the light source (LED10) with respect to a high state corresponds to a duration of temporary interruption of the control signal for turning on the light source (LED10) of less than 10%.

5. A communication device comprising an electronic module (100) and a detection sensor (200), said detection sensor comprising a light source (LED10) and being supplied with current by way of a supply line (W10) connected to a voltage source (VBAT), said electronic module being suitable for measuring the modulations of the intensity of the current flowing on said supply line (W10), characterized in that the detection sensor (200) is configured to drive a gradual turning on/turning off of the light source (LED10) by way of a first modulation of the intensity of the current flowing in said light source between a high state in which the light source (LED10) is turned on and a low state in which the light source (LED10) is turned off, and to notify the electronic module (100), when it has detected a predefined event (D), with an information item according to which the event (D) has been detected, in the form of a second predefined modulation of the intensity of current flowing in the light source (LED10) with respect to a high or low state of the intensity of the current depending on whether the light source (LED10) is turned on or turned off.

6. The device as claimed in claim 5, in which the detection sensor (200) is configured to notify the BCM (100) with the information item according to which an event (D) has been detected, that if the intensity of the current flowing in the light source (LED10) is in a high state or a low state.

7. The device as claimed in claim 6 in which, when the detection of an event takes place when the light source (LED10) is in the process of turning on/turning off, the detection sensor (200) is configured to interrupt the gradual turning on/turning off of the light source (LED10) and bring the intensity of current flowing in the light source (LED10) to the high/low state.

8. The device as claimed in claim 6, characterized in that, when the detection sensor notifies the electronic module (100) with an information item according to which the event (D) has been detected, the second predefined modulation of the intensity of current flowing in the light source (LED10) with respect to a high state corresponds to a duration of temporary interruption of the control signal for turning on the light source (LED10) of less than 10%.

9. The device as claimed in claim 5 in which, when the detection of an event takes place when the light source (LED10) is in the process of turning on/turning off, the detection sensor (200) is configured to interrupt the gradual turning on/turning off of the light source (LED10) and bring the intensity of current flowing in the light source (LED10) to the high/low state.

10. The device as claimed in claim 9, characterized in that, when the detection sensor notifies the electronic module (100) with an information item according to which the event (D) has been detected, the second predefined modulation of the intensity of current flowing in the light source (LED10) with respect to a high state corresponds to a duration of temporary interruption of the control signal for turning on the light source (LED10) of less than 10%.

11. The device as claimed in claim 5, characterized in that, when the detection sensor notifies the electronic module (100) with an information item according to which the event (D) has been detected, the second predefined modulation of the intensity of current flowing in the light source (LED10) with respect to a high state corresponds to a duration of temporary interruption of the control signal for turning on the light source (LED10) of less than 10%.

12. An automotive vehicle comprising a communication device as claimed in claim 5.

* * * * *